(12) United States Patent
Puckett et al.

(10) Patent No.: US 10,429,677 B2
(45) Date of Patent: Oct. 1, 2019

(54) OPTICAL WAVEGUIDE HAVING A WIDE BRILLOUIN BANDWIDTH

(71) Applicant: Honeywell International Inc., Morris Plains, NJ (US)

(72) Inventors: Matthew Wade Puckett, Scottsdale, AZ (US); Mary K. Salit, Plymouth, MN (US)

(73) Assignee: Honeywell International Inc., Morris Plains, NJ (US)

( * ) Notice: Subject to any disclaimer, the term of this patent is extended or adjusted under 35 U.S.C. 154(b) by 0 days.

(21) Appl. No.: 15/636,474

(22) Filed: Jun. 28, 2017

(65) Prior Publication Data

US 2018/0081206 A1    Mar. 22, 2018

Related U.S. Application Data

(60) Provisional application No. 62/397,040, filed on Sep. 20, 2016, provisional application No. 62/397,054, filed on Sep. 20, 2016.

(51) Int. Cl.
*G02B 6/12* (2006.01)
*G01C 19/72* (2006.01)
(Continued)

(52) U.S. Cl.
CPC .......... *G02F 1/125* (2013.01); *G01C 19/721* (2013.01); *G02B 6/122* (2013.01); *G02B 6/132* (2013.01);
(Continued)

(58) Field of Classification Search
CPC ........ G02F 1/125; G02F 1/33; G02F 2201/06; G02B 6/122; G02B 6/132; G02B 6/136;
(Continued)

(56) References Cited

U.S. PATENT DOCUMENTS 3,856,378 A   12/1974   Brandt et al.
4,181,904 A    1/1980   Crowley et al.
(Continued)

FOREIGN PATENT DOCUMENTS

EP    0642052 A1    3/1995
EP    0969297 A1    1/2000
WO    2004027476    4/2004

OTHER PUBLICATIONS

Ashraf Mohamedelhassan, "Fabrication of Ridge Waveguides in Lithium Niobate", Printed by Universitetsservice US AB, 2012, pp. i-58, No. ISSN: 0280-316X, Publisher: Royal Institute of Technology KTH, Published in: Stockholm, Sweden.
(Continued)

*Primary Examiner* — Michael P Mooney
(74) *Attorney, Agent, or Firm* — Fogg & Powers LLC

(57) ABSTRACT

An embodiment of a waveguide has a Brillouin bandwidth, and includes cladding and a core. The cladding includes first layers of a first material, each first layer having a physical characteristic of approximately a first value, and includes second layers of a second material, each second layer having the physical characteristic of approximately a second value, the second layers alternating with the first layers such that the Brillouin bandwidth is wider than the Brillouin bandwidth would be if the cladding excluded the first layers or excluded the second layers. For example, the first and second cladding layers can be formed from different materials, or can be formed having different values of a physical characteristic such as thickness, acoustic velocity, or index of refraction. Such a waveguide can facilitate alignment of the waveguide's optical bandwidth with the waveguide's Brillouin bandwidth because the Brillouin bandwidth is widened compared to conventional waveguides.

17 Claims, 7 Drawing Sheets

(51) Int. Cl.
| | |
|---|---|
| *G02B 6/036* | (2006.01) |
| *G02B 6/122* | (2006.01) |
| *G02B 6/132* | (2006.01) |
| *G02B 6/136* | (2006.01) |
| *G02F 1/125* | (2006.01) |

(52) U.S. Cl.
CPC .............. *G02B 6/136* (2013.01); *G02B 6/036* (2013.01); *G02B 2006/12176* (2013.01); *G02F 2201/06* (2013.01)

(58) Field of Classification Search
CPC .......... G02B 6/036; G02B 2006/12176; G01C 19/721
USPC ........................................... 385/14, 123–132
See application file for complete search history.

(56) References Cited

U.S. PATENT DOCUMENTS

| | | | |
|---|---|---|---|
| 5,131,060 | A | 7/1992 | Sakata |
| 5,138,687 | A | 8/1992 | Horie et al. |
| 5,170,457 | A | 12/1992 | Jen |
| 5,329,397 | A | 7/1994 | Chang |
| 5,400,788 | A | 3/1995 | Fleming et al. |
| 5,511,142 | A | 4/1996 | Horie et al. |
| 5,781,669 | A | 7/1998 | Schmid et al. |
| 5,841,913 | A | 11/1998 | Marcuse et al. |
| 6,052,215 | A | 4/2000 | Montgomery et al. |
| 6,233,379 | B1 | 5/2001 | Kim et al. |
| 6,253,002 | B1 | 6/2001 | Kim et al. |
| 6,266,462 | B1 | 7/2001 | Kim et al. |
| 6,282,332 | B1 | 8/2001 | Bosso et al. |
| 6,510,261 | B2 | 1/2003 | Sorin et al. |
| 6,535,665 | B1 | 3/2003 | Kim et al. |
| 6,542,683 | B1 * | 4/2003 | Evans .................. C03B 37/027 385/127 |
| 6,636,201 | B1 | 10/2003 | Gomes et al. |
| 6,718,110 | B2 | 4/2004 | Carmannini et al. |
| 6,925,216 | B2 | 8/2005 | Vernon et al. |
| 6,929,899 | B2 | 8/2005 | Pottebaum et al. |
| 6,999,639 | B2 | 2/2006 | Tsarev |
| 7,016,586 | B2 | 3/2006 | Zoorob et al. |
| 7,062,109 | B2 | 6/2006 | Tsunoda et al. |
| 7,103,245 | B2 | 9/2006 | Lee et al. |
| 7,174,080 | B2 | 2/2007 | Walker |
| 7,376,317 | B2 | 5/2008 | Yamada |
| 8,078,021 | B2 | 12/2011 | Ushida |
| 8,442,368 | B1 | 5/2013 | Reano et al. |
| 8,560,048 | B2 | 10/2013 | Eberle et al. |
| 10,041,797 | B2 | 8/2018 | Jain et al. |
| 2003/0156813 | A1 | 8/2003 | Terakawa et al. |
| 2003/0161375 | A1 | 8/2003 | Filgas et al. |
| 2003/0176002 | A1 | 9/2003 | Zhang et al. |
| 2004/0037532 | A1 | 2/2004 | Park et al. |
| 2004/0105485 | A1 | 6/2004 | Bures et al. |
| 2005/0286826 | A1 | 12/2005 | Tsunoda et al. |
| 2006/0037532 | A1 | 2/2006 | Eidson |
| 2006/0171648 | A1 * | 8/2006 | Hasegawa .......... G02B 6/03644 385/127 |
| 2008/0013906 | A1 | 1/2008 | Matsuo et al. |
| 2009/0148112 | A1 | 6/2009 | Koyamada et al. |
| 2009/0263092 | A1 | 10/2009 | Flammer et al. |
| 2010/0092132 | A1 | 4/2010 | Ushida |
| 2010/0238538 | A1 | 9/2010 | Rice et al. |
| 2011/0081123 | A1 | 4/2011 | Pare et al. |
| 2012/0189258 | A1 | 7/2012 | Overton et al. |
| 2013/0170802 | A1 | 7/2013 | Pitwon |
| 2013/0188918 | A1 | 7/2013 | Painchaud et al. |
| 2014/0320863 | A1 | 10/2014 | Christensen et al. |
| 2015/0288135 | A1 | 10/2015 | Qiu et al. |
| 2018/0081112 | A1 | 3/2018 | Puckett et al. |
| 2018/0081113 | A1 | 3/2018 | Puckett et al. |
| 2018/0081115 | A1 | 3/2018 | Puckett et al. |
| 2018/0081205 | A1 | 3/2018 | Puckett |

OTHER PUBLICATIONS

Bauters et al., "Planar Waveguides With Less Than 0.1 dB/m Propagation Loss Fabricated With Wafer Bonding", https://doi.org/10.1364/OE.19.024090, 2011, pp. 1-12, Publisher: Optical Society of America.

Bogaerts, Wim et al. "Silicon microring resonators"; Laser Photonics Rev. 6, No. 1, pp. 47-73 (2012); www.lpr-journal.org.

Courjal et al, "High Aspect Ratio Lithium Niobate Ridge Waveguides Fabricated by Optical Grade Dicing", "Journal of Physics", "https://hal.archives-ouvertes.fr/hal-00637796", Dated Nov. 3, 2011, pp. 1-13, Publisher: IOP Publishing.

Laude et al, "Generation of Photons from Electrostriction in Small-Core Optical Waveguides", "AIP Advances 3, Apr. 21, 2009", Dated 2013, pp. Cover, 042109-1-042109-12, Publisher:American Institute of Physics.

Laude et al, "Lagrangian Description of Brillouin Scattering and Electrostriction in a Nanoscale Optical Waveguides", "New Journal of Physics", Dated 2015, "http://iopscience.iop.org/1367-2630/17/12/125003", Downloaded Dec. 12, 2015, Publisher: IOP Publishing.

Normandin et al, "Scattering of Guided Optical Beams by Surface Acoustic WAves in Thin Films", "Journal of Optical Society of America", Dated Aug. 1979, pp. 1153-1165, vol. 69, No. 8, Publisher: Optical Society of America.

Pennec et al, "Modeling Light-Sound Interaction in Nanoscale Cavities and Waveguides", "Nanophotonics 2014; 3(6)", pp. 413-440, Publisher: Science Wise Publishing & De Gruyter.

Robinson, "A Dissertation presented to the Faculty of the Graduate School of Cornell University, Nanoscale Light Confinement: Principles, Measurement, and Applications", Dated Jan. 2009, pp. 1-108, : Publisher: Jacob Thomas Robinson.

Rowell et al, "Brillouin Scattering in a Thin Film Waveguide", "Applied Physics Letters, 32(3)", "https://doi.org/10.1063/1.89965", Dated Feb. 1, 1978, pp. Cover,154-155, Publisher: American Institute of Physics.

Schmidt et al, "Thin Film Acoustic Surface Waveguides on Anisotropic Media", "IEEE Transactions on Sonics and Ultrasonics", Dated Mar. 1975, pp. 115-122, vol. SU-22, No. 2, Publisher: IEEE.

Seshadri, "Quasi-optics of the Coupling of Guided Modes in Two Paralles, Indentical Dielectric Waveguides", "Journal Optical Society of America,", Dated Jun. 1987, pp. 1030-1036, vol. 4, No. 6, Publisher: Optical Society of America.

U.S. Patent and Trademark Office, "Advisory Action"; U.S. Appl. No. 15/379,165, dated Apr. 6, 2018, pp. 1-14, Published in: US.

U.S. Patent and Trademark Office, "Office Action"; U.S. Appl. No. 15/591,747; dated May 18, 2018; pp. 1-18; Published in: US.

U.S. Patent and Trademark Office; "Office Action" U.S. Appl. No. 15/379,165; dated May 18, 2018; pp. 1-30; Published: US.

Wolff et al, "Germanium as a Material for Stimulated Brillouin Scattering in the Mid-infrared", "Optics Express", Dated: Dec. 15, 2014, pp. 30735-30747, vol. 22, No. 25, Publisher: OSA.

Yasumoto et al, "Numerical Analysis of Two-Parallel Embedded Optical Waveguides", "Journal Optical Society of America", Dated Sep. 1987, pp. 1713-1719, vol. 4, No. 9, Publisher: Optical Society of America.

Yasuura et al, "Numerical Analysis of Thin-Film Waveguide by Mode-Matching Method", "Journal Optical Society of America", Dated Feb. 1980, pp. 183-191, vol. 70, No. 2Publisher: Optical Society of America.

European Patent Office, "Extended European Search Report for EP Application No. 17178890.4", "Foreign Counterpart to U.S. Appl. No. 15/591,747", dated Jan. 11, 2018, pp. 1-11, Published in: EP.

European Patent Office, "Extended European Search Report for EP Application No. 17178891.2", "Foreign Counterpart to U.S. Appl. No. 15/591,836", dated Jan. 11, 2018, pp. 1-11, Published in: EP.

United States Patent and Trademark Office, "Restriction Requirement for U.S. Appl. No. 15/591,836", dated Jan. 30, 2018, pp. 1-7, Published in: US.

European Patent Office, "Extended European Search Report for EP Application No. 17178894.6", "Foreign Counterpart to U.S. Appl. No. 15/379,165", dated Jan. 17, 2018, pp. 1-11, Published in: EP.

(56) References Cited

OTHER PUBLICATIONS

Eggleton et al, "Inducing and Harnessing Stimulated Brillouin Scattering in Photonic Integrated Circuits", "Advances in Optics and Photonics 5", Dec. 19, 2013, pp. 536-587, Publisher: Optical Society of America.
Poulton et al, "Acoustic Confinement and Stimulated Brillouin Scattering in Integrated Optical Waveguides", "Journal of the Optical Society of America B", Oct. 1, 2013, pp. 2657-2664, vol. 30, No. 10, Publisher: Optical Society of America.
Rakich et al, "Traveling-wave Photon-phonon Coupling as the Basis for New Signal Processing Technologies", "Micro-and Nanotechnology Sensors, Systems, and Applications VI", , pp. 908317-1-908317-12, vol. 9083, Publisher: SPIE.
Shin et al, "Tailorable Stimulated Brillouin Scattering in Nanoscale Silicon Waveguides", "Nature Communications", Jun. 6, 2013, pp. 1-10, Publisher: Macmillan Publishers Limited.
U.S. Patent and Trademark Office, "Office Action", "from U.S. Appl. No. 15/591,747", dated Dec. 14, 2017, pp. 1-21, Published in: US.
U.S. Patent and Trademark Office, "Final Office Action", "from U.S. Appl. No. 15/379,165", dated Dec. 20, 2017, pp. 1-20, Published in: US.
European Patent Office, "Extended European Search Report for EP Application No. 17181056.7", "from Foreign Counterpart to U.S. Appl. No. 15/636,480", dated Jan. 2, 2018, pp. 1-7, Published in: EP.
Barrios, Carlos et al, "Optical Slot-Waveguide Based Biochemical Sensors", "Sensors", "www.mdpi.com/journal/sensors", Jun. 16, 2009, pp. 4751-4765.
Bian, Dandan et al, "Design of a Polymer-filled Silicon Nitride strip/slot asymmetric hybrid waveguide for realizing both flat dispersioin and athermal operation", "Applied Optics", Jun. 20, 2016, pp. 4827-4832, vol. 55, No. 18, Publisher: Optical Society of America.
Ma, Tian-Xue et al, "Acousto-optical interaction of surface acoustic and optical waves in a two-dimensional phoxonic crystal heterostructure cavity", "Optics Express", Nov. 17, 2014, pp. 28443-28451, vol. 22, No. 23, Publisher: Optical Society of America.
Mirnaziry, Sayyed Reza et al, "Stimulated Brillouin Scattering in Silicon/Chalcogenide Slot Waveguides", "Optic Express", Feb. 25, 2016, pp. 4786-4800, vol. 24, No. 5, Publisher: Optical Society of America.
Puckett, Matthew et al, "Silicon nanoridge array waveguides for nonlinear and sensing applications", "Optics Express", Nov. 2, 2015, pp. 28224-28233, vol. 23, No. 22, Publisher: Optical Society of America.
Puckett, Matthew et al, "Observation of second-harmonic generation in silicon nitride waveguides through bulk nonlinearities", , pp. 1-10.
Rahman et al, "Characterization of Acousto-optical Interaction in Planar silica optical waveguide by the finite element method", "Journal of the Optical Society of America B", May 1, 2016, pp. 810-818, vol. 33, No. 5, Publisher: Optical Society of America.
Sarabalis, Christopher et al, "Guided acoustic and optical waves in silicon-on-insulator for Brillouin scattering and optomechanics", "Physics Optics", Apr. 16, 2016, pp. 1-5.
Sriratanavaree et al, "Rigorous Characterization of acoustic-optical interactions in silicon slot waveguides by full-vectorial finite element method", "Optics Express", Apr. 21, 2014, pp. 9528-9537, vol. 22, No. 8, Publisher: Optical Society of America.
Sriratanavaree et al, "Rigorous analysis of acoustic modes in low and high index contrast silica fibers", "Applied Optics", Mar. 20, 2015, pp. 2550-2557, vol. 54, No. 9, Publisher: Optical Society of America.
Vanlaer, Raphael et al, "Interaction between light and highly confined hypersound in a silicon photonic nanowire", "Physics Optics", Jul. 18, 2014, pp. 1-10.
Vanlear, Raphael et al, "Analysis of enhanced stimulated Brillouin scattering in silicon slot waveguides", "Optics Letters", Mar. 1, 2014, pp. 1242-1245, vol. 39, No. 5, Publisher: Optical Society of America.
Wang, Zheng et al, "Slow light through tightly coupled light waves and acoustic waves in nanoscale waveguides", "Proceedings of Spie", "SPIEDigitalLibrary.org/conference-proceedings-of-spie", Mar. 6, 2013, pp. 1-14, vol. 8636.
Zhang et al., "Analysis of acousto-optic interaction based on forward stimulated Brillouin scattering in hybrid phononic-photonic waveguides", "Optics Express", Jun. 13, 2016, pp. 13051-13059, vol. 24, No. 12.
U.S. Patent and Trademark Office; "Office Action" U.S. Appl. No. 15/591,836; dated May 31, 2018; pp. 1-38; Published: US.
European Patent Office, "Extended European Search Report for EP Application No. 17180384.4", "Foreign Counterpart to U.S. Appl. No. 15/636,474", dated Jan. 5, 2018, pp. 1-8, Published in: EP.
U.S. Patent and Trademark Office, "Office Action", U.S. Appl. No. 15/636,480, Jul. 12, 2018, pp. 1-45, Published: US.
U.S. Patent and Trademark Office, "Office Action", "from U.S. Appl. No. 15/379,165", dated Jun. 16, 2017, pp. 1-14, Published in: US.
United States Patent and Trademark Office, "Restriction Requirement", "from U.S. Appl. No. 15/379,165", dated Mar. 24, 2017, pp. 1-6, Published in: US.
Sriratanavaree, "Characterisation of Acoustic Waves in Optical Waveguides", "A Thesis Submitted for the Degree of Philosophy", Jan. 2014, pp. 1-233, Publisher: City University London, Published in: GB.
Li et al., "Characterization of a high coherence, Brillouin microcavity laser on silicon", T.J Watson Laboratory of Applied Physics, California Institute of Technology, 2012, pp. 1-11, Published in: US.
U.S. Patent and Trademark Office, "Final Office Action from U.S. Appl. No. 15/591,747 dated Oct. 12, 2018", pp. 1-23, Published in: US.
U.S. Patent and Trademark Office, "Notice of Allowance for U.S. Appl. No. 15/630,261 dated Oct. 10, 2018", pp. 1-37, Published in: US.
U.S Patent and Trademark Office, Notice of Allowance from U.S. Appl. No. 15/636,480 dated Nov. 21, 2018, pp. 1-13, Published in: US.
U.S Patent and Trademark Office, "Supplemental Notice of Allowability from U.S. Appl. No. 15/630,261 dated Nov. 28, 2018", pp. 1-11, Published in: US.
European Patent Office, "European Office Action from EP Application No. 17178894.6 dated Nov. 8, 2018", "from Foreign Counterpart to U.S. Appl. No. 15/379,165", filed Nov. 8, 2018, pp. 1-6, Published in: EP.
U.S. Patent and Trademark Office, "Advisory Action for U.S. Appl. No. 15/591,747 dated Dec. 31, 2018", pp. 1-4, Published in: US.
U.S. Patent and Trademark Office, "Final Office Action for U.S. Appl. No. 15/379,165 dated Jan. 2, 2019", pp. 1-23, Published in: US.
U.S. Patent and Trademark Office, "Miscellaneous communication regarding Advisory Action for U.S. Appl. No. 15/591,747 dated Jan. 7, 2019", pp. 1-2, Published in: US.
U.S. Patent and Trademark Office, "Notice of Allowance from U.S. Appl. No. 15/591,836 dated Dec. 20, 2018", pp. 1-26, Published in: US.

* cited by examiner

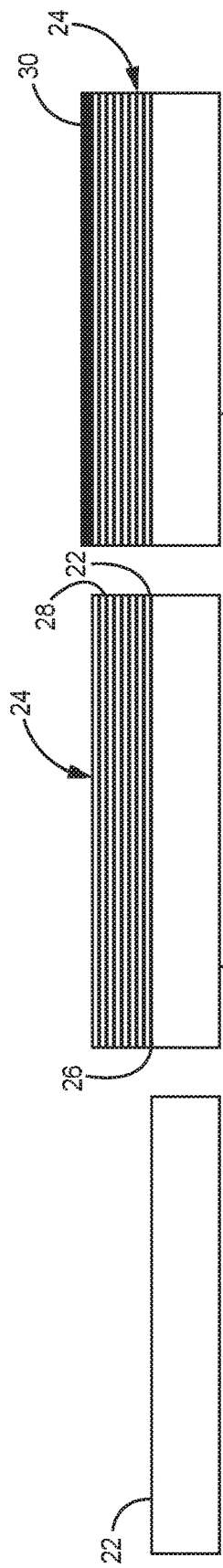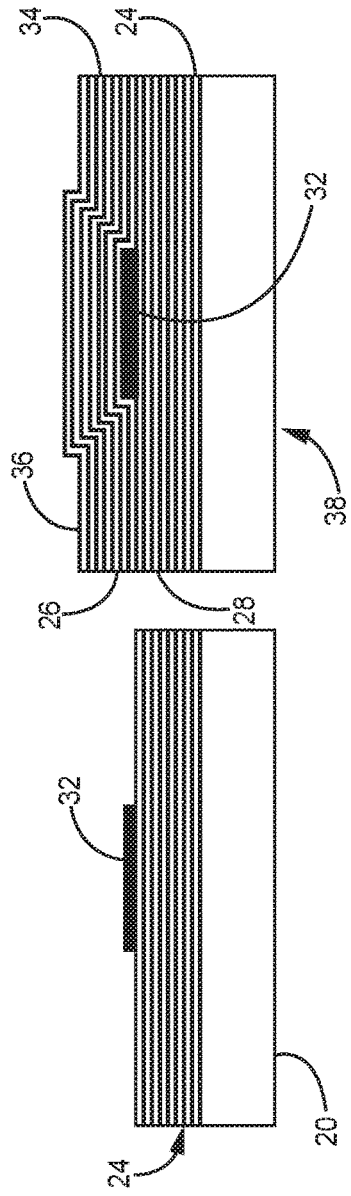

OPTICAL WAVEGUIDE HAVING A WIDE BRILLOUIN BANDWIDTH

PRIORITY CLAIM

This application claims priority to U.S. Patent Application Ser. No. 62/397,054 filed 20 Sep. 2016, and to U.S. Patent Application Ser. No. 62/397,040, filed 20 Sep. 2016, the contents of these applications being incorporated by reference herein.

STATEMENT REGARDING FEDERALLY SPONSORED RESEARCH OR DEVELOPMENT

This invention was made with Government support under N66001-16-C-4017 awarded by SPAWAR Systems Center Pacific. The Government has certain rights in the invention. This material is based upon work supported by the Defense Advanced Research Projects Agency (DARPA) and Space and Naval Warfare Systems Center Pacific (SSC Pacific).

SUMMARY

As an electromagnetic wave propagates through a carrier material, it can cause the material to vibrate in one or more acoustic modes called phonons. In these modes, the vibrations deform the carrier material in a periodic fashion, and, therefore, set up deformation (i.e., pressure) waves that propagate through the material. These pressure waves cause the carrier material to oscillate in one or more resonant modes (i.e., acoustic modes), and this oscillating can cause a respective periodic change in one or more properties (e.g., the spacing between molecules or between atoms) of the material. For example, this oscillating can generate periodically varying acoustic dipoles within the carrier material via the photo-elastic effect. And these periodic changes in one or more properties of the carrier material can induce a change in the momentum of a portion of the propagating electromagnetic wave. That is, the oscillating carrier material can effectively scatter a fraction of the propagating electromagnetic wave's energy, and thus can generate one or more scattered electromagnetic waves at one or more frequencies that are different from the frequency of the propagating electromagnetic wave.

For example, as a light wave (i.e., an electromagnetic wave having a wavelength in or near the optical or visible portion of the electromagnetic spectrum) propagates through an optical waveguide such as an optical fiber or an integrated optical waveguide, the propagating light wave excites, in the waveguide, one or more acoustic modes that cause the waveguide to act as an oscillating grating that diffracts, and thus scatters, a portion of the propagating light wave.

Such scattering of a propagating light wave caused by one or more acoustic modes that the light wave excites in a waveguide material is called Brillouin scattering. This scattering is also called stimulated Brillouin scattering (SBS) because it is the propagating light wave that excites, or stimulates, the one or more acoustic modes that cause the Brillouin scattering.

If the Brillouin scattering of a propagating light wave is additive (i.e., coherent) along a propagation dimension within the waveguide, then the resulting one or more light waves generated by the coherent Brillouin scattering in the propagation dimension are called Stokes waves.

A Stokes wave typically has a frequency that is less than, i.e., downshifted from, the frequency of the propagating light wave because the portion of the energy of the propagating light wave that excites the one or more acoustic modes is absorbed by the waveguide material. As is known, the properties (e.g., phase, frequency, and power) of a Stokes wave depend on the properties (e.g., phase, frequency, and power) of the one or more acoustic modes that the propagating light wave excites in the waveguide, on the physical properties (e.g., atomic structure, molecular structure, crystal-lattice structure, dimensions, material, density, permittivity, permeability) of the waveguide and of the material(s) from which the waveguide is formed, and on conditions (e.g., temperature, humidity, stress, strain) to which the waveguide is exposed.

In a straight waveguide (and in a curved waveguide in which the radii of curvature is much greater (e.g., at least ten times greater) than the wavelength of the exciting light wave), a Stokes wave typically propagates in a direction opposite (counter) to the direction of propagation of the light wave that induces the Stokes wave; that is, a Stokes wave typically propagates in a reverse or backwards direction, i.e., in a direction that is opposite to the direction in which the Stokes-wave-inducing light wave propagates. So if the Stokes-wave-inducing light wave enters a straight (or curved per above) waveguide at a first end and exits the straight waveguide at a second end, then a Stokes wave induced by the light wave typically counter propagates toward, and exits the waveguide from, the first end.

Furthermore, the level of Brillouin scattering that a waveguide imparts to a propagating light wave is typically quantified as the Brillouin gain. Typically, the Brillouin gain of a waveguide is characterized as a function of the frequency or wavelength of the acoustic-mode-exciting light wave, and is plotted as a gain versus the frequency or the wavelength of the exciting light wave, where the gain equals the magnitude of the normalized ratio of the energy or power of the Brillouin scattered waves to the energy or power of the exciting light wave per unit length of the waveguide.

Moreover, the frequency and wavelength at which the Brillouin gain has a maximum, or peak, value typically depends on the properties (e.g., phase, frequency, and energy) of the one or more acoustic modes that the propagating wave excites in the waveguide, on the physical properties (e.g., atomic structure, molecular structure, crystal-lattice structure, dimensions, material, density, permittivity, permeability) of the waveguide and the materials from which the waveguide is formed, and on conditions (e.g., temperature, humidity, stress, strain) to which the waveguide is exposed.

In addition, the full-bandwidth-at-half-maximum (FWHM) Brillouin gain (i.e., the FWHM Brillouin bandwidth), is defined as a region around the peak value of the Brillouin gain bounded by the frequencies/wavelengths at which the Brillouin gain, in units of power or energy, is ½ the peak Brillouin gain.

In some applications (e.g., communications, navigation), it is sometimes desirable to align the optical-resonant frequency of an optical device (e.g., optical resonator, optical gyroscope), or one or more of the optical-resonant frequencies of the device if the device has multiple resonant modes, with the FWHM Brillouin bandwidth.

Or more generally, in some applications it is desirable to align at least a portion of the FWHM optical bandwidth of an optical device with the FWHM Brillouin bandwidth of the optical device.

But unfortunately, because the FWHM Brillouin bandwidth of a material typically is relatively narrow (e.g., on the order of tens of megahertz (MHz)) on an optical scale, it can be difficult to align a portion (e.g., the optical-resonant frequency) of the FWHM optical bandwidth of an optical device with the device's FWHM Brillouin bandwidth.

And such difficulty in aligning a portion of a device's FWHM optical bandwidth with the device's FWHM Brillouin bandwidth often is exacerbated by the shifting of a device's FWHM Brillouin bandwidth in response to environmental parameters such as the temperature of the device; even a relatively small shift can cause the FWHM Brillouin bandwidth to become misaligned with the desired portion of the device's FWHM optical bandwidth.

Unfortunately, there are no reported techniques for better aligning a device's FWHM optical bandwidth (or a portion thereof) with the device's FWHM Brillouin bandwidth.

But described below are one or more exemplary techniques for facilitating alignment of a device's optical bandwidth (e.g., FWHM optical bandwidth) with the device's Brillouin bandwidth (e.g., FWHM Brillouin bandwidth).

In at least on such exemplary technique, the FWHM Brillouin bandwidth of an optical device, such as a waveguide, is significantly widened.

And such an optical device can be configured to facilitate alignment of a portion of the device's optical bandwidth with the device's Brillouin bandwidth by widening the device's Brillouin bandwidth to include, i.e., to overlap, the portion of the device's optical bandwidth.

In an embodiment, a waveguide (e.g., an integrated waveguide) has a Brillouin bandwidth, and includes cladding and a core. The cladding includes first layers of a first material, each first layer having a physical characteristic of approximately a first value, and includes second layers of a second material, each second layer having the physical characteristic of approximately a second value, the second layers alternating with the first layers such that the Brillouin bandwidth is wider than the Brillouin bandwidth would be if the cladding excluded the first layers or excluded the second layers.

For example, the first and second cladding layers can be formed from different materials, can be formed to have different values of a physical characteristic (e.g., thickness, acoustic velocity, or index of refraction), or can be formed from different materials and to have different values of a physical characteristic.

Such a waveguide can form, therefore, in whole or in part, an optical device having an optical FWHM bandwidth that overlaps the device's FWHM Brillouin bandwidth. Such an overlap in optical and Brillouin bandwidths can cause the optical device to promote a Stokes wave that is stimulated, or otherwise induced, by an optical wave propagating in the device, and such promotion of a Stokes wave can be useful, for example, in an optical device that is, that includes, or that forms part of, an optical resonator or an optical gyroscope.

Furthermore, an embodiment of a method for forming such a waveguide includes forming a core, and forming, around the core, a cladding having alternating first and second layers, the first layers and second layers being formed from different materials, the first layers having a different value of a physical parameter (e.g., thickness, acoustic velocity, index of refraction) than the second layers, or the first layers and second layers being formed from different materials and having a different value of a physical parameter.

BRIEF DESCRIPTION OF THE DRAWINGS

FIG. 2-6 are views of structures at respective steps of a process for forming an acousto-optic waveguide having an alternating-layer cladding that imparts to the waveguide a FWHM Brillouin bandwidth that is wider than the FWHM Brillouin bandwidth of the waveguide of FIG. 1, according to an embodiment.

DETAILED DESCRIPTION

Each value, quantity, or attribute herein preceded by "substantially," "approximately," "about," a form or derivative thereof, or a similar term, encompasses a range that includes the value, quantity, or attribute ±20% of the value, quantity, or attribute, or a range that includes ±20% of a maximum difference from the value, quantity, or attribute. For example, "two planes are substantially parallel to one another" encompasses an angle $-18°≤α≤18°$ between the two planes ($|90°|$ is the maximum angular difference between the two planes, ±20% of $|90°|$ is ±18°, and the two planes are parallel to one another when $α=0°$). Similarly, "a substantially planar surface" encompasses an angle $-18°≤φ≤+18°$ formed by a plane that bisects the surface and any arbitrary tangent to any point of the surface.

Figure 1:
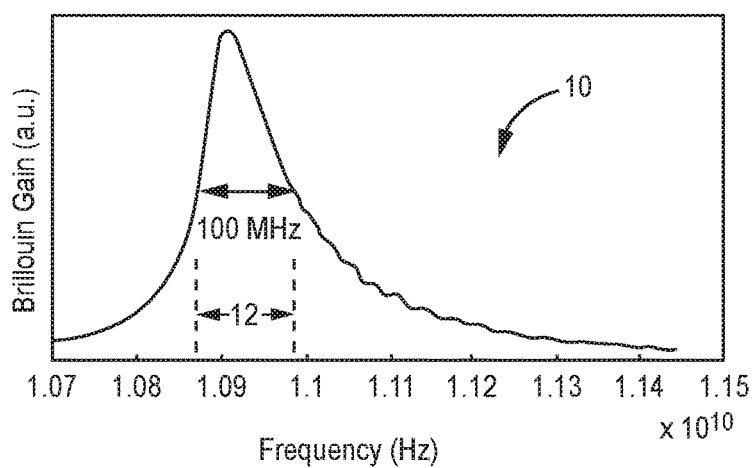
FIG. 1 is plot of the Brillouin gain versus frequency, i.e., of the Brillouin gain profile, of an acousto-optic waveguide having a continuous cladding.

FIG. 1 is a plot of the normalized Brillouin gain profile 10 (gain in arbitrary units) of a conventional homogenous-cladding acousto-optic waveguide (not shown in FIG. 1) in which each of the one or more cladding layers has approximately the same acoustic velocity, which is the speed and direction at which an acoustic wave, induced by a light wave propagating through the waveguide, travels through the waveguide. For example, a waveguide having the Brillouin gain profile 10 includes a homogeneous cladding that has an acoustic velocity of approximately 5968 meters/second (m/s).

The FWHM Brillouin bandwidth 12 of the homogenous-cladding acousto-optic waveguide is only about 100 megahertz (MHz) wide.

Putting this in perspective, at optical frequencies, a 100 MHz bandwidth is equivalent to $Δλ≈0.2$ nanometers (nm) between the wavelength corresponding to the lower end of the bandwidth and the wavelength corresponding to the upper end of the bandwidth.

Therefore, the FWHM Brillouin bandwidth 12 of the homogenous-cladding acousto-optic waveguide is relatively narrow at optical frequencies and wavelengths.

Unfortunately, the relatively narrow FWHM Brillouin bandwidth 12 can hinder alignment of the waveguide's FWHM optical bandwidth with the FWHM Brillouin bandwidth. For example, the relatively narrow FWHM Brillouin bandwidth 12 can hinder alignment of the waveguide's optical resonant frequency(ies) with the FWHM Brillouin bandwidth 12.

As described above, such an alignment of the optical and Brillouin bandwidths may be desired for the purpose of promoting the generation of one or more Stokes waves.

FIGS. 2-6 are views of structures at respective steps, or stages, of a process for forming an acousto-optic waveguide, according to an embodiment in which the resulting waveguide has a significantly wider FWHM Brillouin bandwidth than does a homogeneous-cladding acousto-optic waveguide such as described above in conjunction with FIG. 1.

Referring to FIG. 2, at the start of the formation process, a wafer 20 having a substantially flat top surface 22 is formed or otherwise provided. The wafer 20 can be formed from any suitable material (e.g., single-crystal silicon, sapphire) and wafer-formation process, and is flat enough (e.g., atomically flat) to allow formation of a waveguide having levels of optical loss and optical distortion that are suitable for an intended application of the waveguide.

Next, referring to FIG. 3, a first cladding region 24 is formed over the top surface 22 of the wafer 20 according to any suitable process, and is optically transparent and has a relatively low (e.g., <1.5) index of refraction n. The cladding region 24 is formed by forming alternating (e.g., interleaved) first layers 26 and second layers 28, each first layer having a respective first index of refraction of approximately $n_1$ and having a respective first acoustic velocity of approximately $V_{ac1}$, and each second layer having a respective second index of refraction of approximately $n_2$ and having a respective second acoustic velocity of approximately $V_{ac2}$. For example, in an embodiment, $n_1=1.43$, $n_2=1.45$, $V_{ac1}=5968$ m/s, $V_{ac2}=6078$ m/s, and $$n \approx \frac{n_1 + n_2}{2} \approx 1.44.$$

If the first cladding region 24 is formed by plasma-enhanced chemical-vapor deposition (PECVD), then each first layer 26 and each second layer 28 can be formed by altering the flow rate of one or more of the precursor gases into the formation chamber. For example, if the first cladding region 24 is formed from $SiO_2$ (silicon dioxide) and the precursor gases are $SiH_4$ (silane) and $N_2O$ (nitrous oxide), then the flow of the $SiH_4$ can be at one rate during formation of the first layers 26 and can be at another rate during formation of the second layers 28. Alternatively or in addition, the flow of $N_2O$ can be at one rate during formation of the first layers 26 and can be at another rate during formation of the second layers 28. Moreover, although described as being formed from Silicon Dioxide ($SiO_2$), the first cladding region 24 can be formed from any other suitable material such as Silicon Oxynitride (SiON), Zinc Oxide (ZnO), Aluminum Oxide ($Al_2O_3$), or Calcium Fluoride ($CaF_2$). In addition, although described as being formed by PECVD, the first cladding region 24 can be formed from any other suitable technique such as sputtering or chemical-vapor-deposition (CVD).

Still referring to FIG. 3, the formation of the alternating first layers 26 and second layers 28 continues until the first cladding region 24 attains a suitable thickness, such as, for example, 2.0-6.0 microns (μm). Each of the first layers 26 and second layers 28 can have approximately the same thickness, for example, about one tenth to one one-hundredth the thickness of the first cladding region 24. Alternatively, the first layers 26 can each have approximately a first thickness and the second layers 28 can each have approximately a second thickness that is different from the first thickness. Or, one or more of the first layers 26 can each have thickness that is different from the thickness of each of one or more other ones of the first layers, and one or more of the second layers 28 can each have a thickness that is different from the thickness of each of one or more other ones of the second layers. Furthermore, the number of the first layers 26 can be equal to, or different from, the number of second layers 28.

Then, referring to FIG. 4, a layer 30 is formed (e.g., by PECVD, sputtering, or CVD) over the first cladding region 24. The layer 30 is optically transparent, has a higher index of refraction $n_3$ than either of the layers 26 and 28, can have any suitable thickness such as approximately one to ten times the thickness of each first layer 26 or of each second layer 28, and can be made from any suitable material such as Silicon (Si), Silicon Nitride ($SiN_x$), Silicon Oxynitride (SiON), Silicon Carbide (SiC), Diamond (C), Silicon Germanium (SiGe), Germanium (Ge), Gallium Arsenide (GaAs), Gallium Nitride (GaN), Gallium Phosphide (GaP), or Lithium Niobate ($LiNbO_3$).

Next, referring to FIG. 5, the layer 30 is patterned (e.g., using photolithography or electron-beam lithography) and etched (e.g., anisotropically such as with reactive ion etching (RIE) or wet etching) to form a waveguide core 32, which is shown in cross section. The core 32 can have any suitable dimensions. For example, the core 32 can have approximately the same thickness as the layer 30 before patterning, and can have a width that is in an approximately range of one to one hundred times its thickness.

Then, referring to FIG. 6, a second cladding region 34 is formed over the first cladding region 24 and the waveguide core 32 in a manner similar to the manner in which the first cladding region 24 is formed as described above in conjunction with FIG. 3. That is, like the first cladding region 24, the second cladding region 34 is formed from the alternating first layers 26 and second layers 28 and to approximately the same thickness as the first cladding region. Alternatively, the second cladding region 34 can be formed from a different material or to a different thickness than the first cladding region 24, and can have alternating third and fourth layers each having at least one physical characteristic that is different from the same physical characteristic of the first and second layers 26 and 28, respectively. For example, at least one of the third or fourth layers can have a respective thickness, acoustic velocity, or index of refraction that is(are) different than the thickness, acoustic velocity, or index of refraction of at least one of the first and second layers 26 and 28, respectively.

To complete the formation of the second cladding region 34, a top surface 36 of the second cladding region can be planed approximately flat using any suitable technique such as chemical-mechanical polishing (CMP).

Still referring to FIG. 6, the combination of the first cladding region 24, the waveguide core 32, and the second cladding region 34 forms an alternating-cladding-layer acousto-optic waveguide 38, according to an embodiment. The waveguide 38 can also be called a nanocomposite acousto-optic waveguide. Furthermore, additional process steps can be performed to form other devices on the wafer 20, to passivate the wafer, etc.

Because the indices of refraction $n_1$ and $n_2$ of the first and second layers 26 and 28 are relatively close together, and because the thicknesses of the first and second layers are relatively small compared to the thicknesses of the first and second cladding regions 24 and 34, the first and second cladding regions each have an effective index of refraction $$n \approx \frac{n_1 + n_2}{2}$$

(assuming that the first and second layers each have approximately the same physical characteristics in both of the cladding regions 24 and 34) such that forming the cladding regions from layers having respective acoustic velocities has negligible or no detrimental effect on the optical properties of the waveguide 38.

Figure 7:
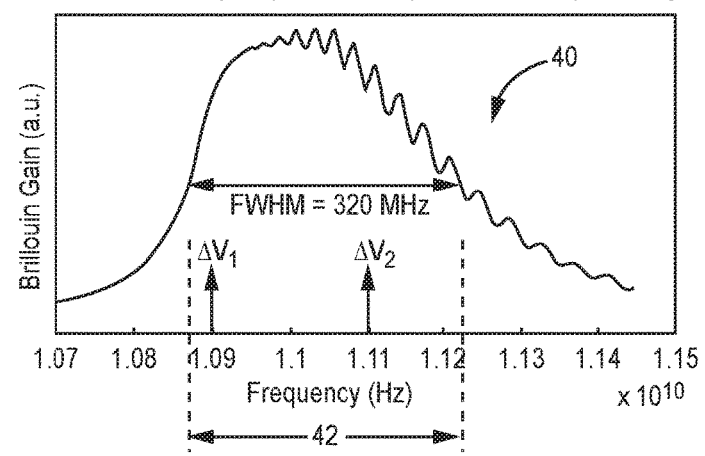
FIG. 7 is plot of the Brillouin gain profile of the acousto-optic waveguide of FIG. 6, according to an embodiment.

FIG. 7 is plot of the Brillouin gain profile 40 of the alternating-cladding-layer (nanocomposite) acousto-optic waveguide 38 of FIG. 6, according to an embodiment.

Compared to the FWHM Brillouin bandwidth 12 of FIG. 1 for a continuous-cladding (non-composite) acousto-optic waveguide, the FWHM Brillouin bandwidth 42 of the acousto-optic waveguide 38 is approximately three times as wide (~320 MHz vs. ~100 MHz), and includes the frequencies, here $1.09 \times 10^{10}$ Hz and $1.11 \times 10^{10}$ Hz, that respectively correspond to the acoustic velocities $V_{ac1}=5968$ m/s and $V_{ac2}=6078$ m/s of the first and second cladding layers 26 and 28 (FIGS. 3-6). Because $V_{ac1}$ and $V_{ac2}$ are relatively close together, and therefore, correspond to frequencies that are relatively close together ($1.09 \times 10^{10}$ Hz and $1.11 \times 10^{10}$ Hz are ±1% from a center frequency $1.10 \times 10^{10}$ Hz between them), the FWHM Brillouin bandwidth 42 is widened as shown in FIG. 7. If the velocities $V_{ac}$ and $V_{ac2}$ are too far apart, then there can be two relatively narrow FWHM Brillouin bandwidth regions, each like the FWHM Brillouin bandwidth 12, instead of the single, wide FWHM Brillouin bandwidth 42. And if the velocities $V_{ac}$ and $V_{ac2}$ are too close together, then the FWHM Brillouin bandwidth may effectively collapse, and, therefore, may be narrower than desired, even as narrow as the FWHM Brillouin bandwidth 12.

In more detail, the spectral position v (units of frequency) of the peak magnitude of the Brillouin gain of a material is given by the following equation:

$$V = \frac{2n_{eff} v_{ac}}{\lambda_0},$$

where $n_{eff}$ is the effective index of refraction of the guided optical mode in which the pumped light wave is propagating through the material, $V_{ac}$ is the acoustic velocity of the material, and $\lambda_0$ is the free-space wavelength of the pumped/exciting light wave. Furthermore, the FWHM Brillouin bandwidth of the material is typically in the approximate range of 50 MHz-100 MHz per FIG. 1, and the FWHM Brillouin bandwidth typically increases (even beyond 100 MHz), and the peak magnitude of the Brillouin gain typically decreases, as the acoustic loss coefficient of the material increases.

Still referring to FIG. 7, in an embodiment, the spectral position $v_1$ of the peak magnitude of the Brillouin gain of the first layers 26, as calculated by the above equation, is approximately $1.09 \times 10^{10}$ Hz for $n_{eff}=1.4482$, $V_{ac}=5968$ m/s, and $\lambda_0=1.55$ μm, and the FWHM Brillouin bandwidth $\Delta v_1$ of the first layers 26 is approximately 100 MHz.

Similarly, the spectral position $v_2$ of the peak magnitude of the Brillouin gain of the second layers 28, as calculated by the above equation, is approximately $1.11 \times 10^{10}$ Hz for $n_{eff}=1.4482$, $V_{ac2}=6078$ m/s, and $\lambda_0=1.55$ μm, and the FWHM Brillouin bandwidth $\Delta v_2$ of the second layers 28 is also approximately 100 MHz.

Because $v_1$ and $v_2$ are close enough together, their corresponding Brillouin gain profiles combine to form the widened Brillouin gain profile 40.

Therefore, a designer of the optical waveguide 38 of FIG. 6 can "play around" with the peak-Brillouin-gain positions $v_1$ and $v_2$ to obtain a desired value of the FWHM Brillouin bandwidth 42 of the waveguide.

Referring to FIGS. 2-7, alternate embodiments of the acousto-optical waveguide 38, and the process for forming the waveguide, are contemplated. For example, although described as having two alternating layers, one or both of the cladding regions 24 and 34 can have three or more alternating layers, where each set of layers has a physical characteristic (e.g., thickness, acoustic velocity, index of refraction) that is different from the same physical characteristic of at least one other set of layers. Furthermore, although described as being an integrated waveguide, a non-integrated waveguide, such as an optical fiber, can be formed in a manner consistent with FIGS. 2-6 to impart to the non-integrated waveguide a wider FWHM Brillouin bandwidth. Moreover, although broadening of the FWHM Brillouin bandwidth may come at the cost of reducing the peak Brillouin gain value, for applications, such as Brillouin lasing for optical gyroscopes, that may benefit from a spectrally invariant gain value rather than a particularly large gain coefficient, a reduced peak Brillouin gain may be, in fact, a desirable side-effect of Brillouin bandwidth widening. Furthermore, the embodiments of subwavelength techniques (i.e., the first layers 26 and the second layers 28 each have thicknesses much less than the wavelength of light for which the waveguide 38 is configured) described above may be combined with embodiments of acoustic-waveguide techniques to increase the peak value of the Brillouin gain while maintaining a widened FWHM Brillouin bandwidth at approximately the same spectral position.

Figure 8:
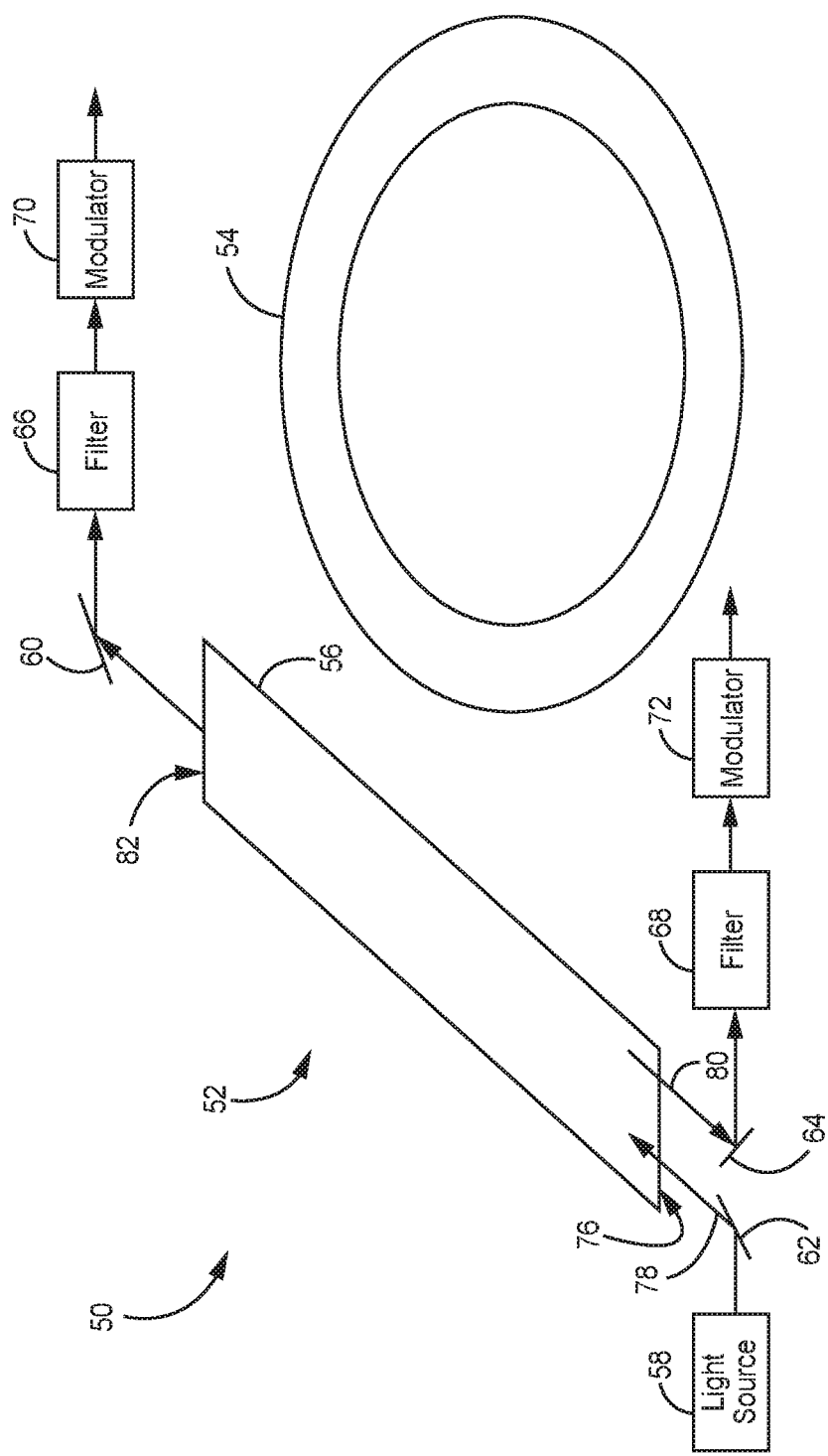
FIG. 8 is a diagram of an optical communication assembly having an optical resonator that can include the acousto-optic waveguide of FIG. 6, according to an embodiment.

FIG. 8 is a diagram of an optical communication assembly 50, which includes an optical resonator 52 having a resonator section 54 and a bus waveguide 56 each having the same structure as the acousto-optic waveguide 38 of FIG. 6, according to an embodiment. For purposes of example, it is assumed that the ring resonator 54 and the bus waveguide 56 each have the FWHM Brillouin bandwidth 42 of FIG. 7, it being understood that the resonator section and bus waveguide can have other FWHM Brillouin bandwidths.

In addition to the optical resonator 52, the optical communication assembly 50 includes a light source 58 (e.g., a laser), deflectors 60, 62, and 64, first and second filters 66 and 68, and first and second modulators 70 and 72.

Figure 9:
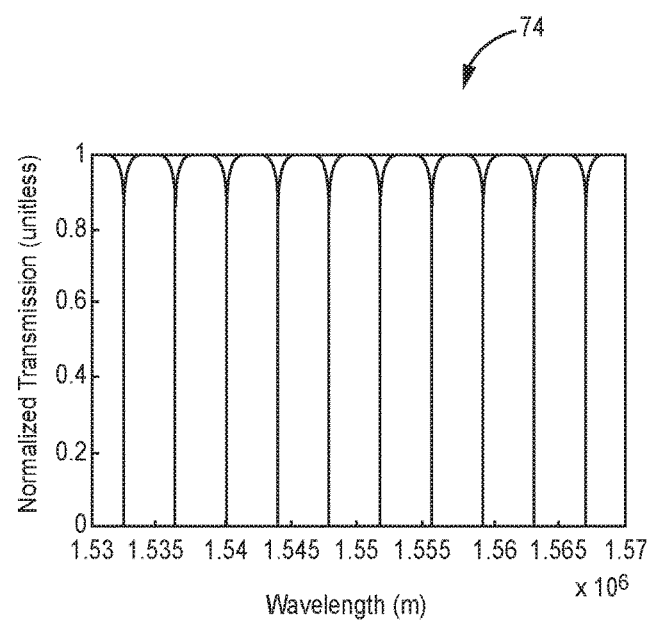
FIG. 9 is a plot of the transmission spectrum of the bus waveguide of FIG. 8, according to an embodiment.

FIG. 9 is a plot of the transmission spectrum 74 of the bus waveguide 56 of FIG. 8 while coupled to the ring resonator 54, according to an embodiment. The narrow valleys in FIG. 9 indicate frequencies of light waves at which the ring resonator 54 resonates.

Referring to FIGS. 8-9, operation of the optical communication assembly 50 is described according to an embodiment in which the assembly exploits Brillouin scattering to generate one or more Stokes waves for use as information-carrier waves.

For purposes of example, assume that the FWHM Brillouin bandwidths 42 of the ring resonator 54 and the bus waveguide 56 are aligned with, i.e, overlap or include, at least two of the resonant frequencies, $f_n$ and $f_{n-x}$, of FIG. 9 (for example, $f_n=1.55 \times 10^{10}$ and $f_{n-x}=1.545 \times 10^{10}$).

In response to the light source 58 pumping an input end 76 of the bus waveguide 56 with a pumped light wave 78 having the frequency $f_n$, Brillouin scattering, stimulated/ induced by the pumped light wave, generates a counter-propagating Stokes wave 80 having the frequency $f_{n-x}$.

The ring resonator 54 reinforces the pumped light wave 78 at the frequency $f_n$, and, therefore, the pumped light wave propagates from the input end 76 to, and out from, an output end 82 of the bus waveguide 56.

The ring resonator 54 also reinforces the Stokes light wave 80 at the frequency $f_{n-x}$, and, therefore, the Stokes light wave counter-propagates out from the input end 76 the bus waveguide 56.

Consequently, the optical resonator 52 reinforces two resonant modes at $f_n$ and $f_{n-x}$ such that the portion of the pumped light wave's energy that stimulates the Brillouin scattering excites a resonant mode at $f_{n-x}$ instead of being dissipated/wasted, e.g., as heat. That is, by virtue of the FWHM Brillouin bandwidth of the optical resonator 52 overlapping at least one resonant frequency of the optical resonator, the optical communication assembly 50 is configured to exploit Brillouin scattering, which is often an unwanted phenomenon, to generate at least two carrier waves, one at $f_n$ and the other at $f_{n-x}$, in response to only a single pumped light wave 78.

The filter 66, which may be optional, filters the pumped light wave 78 propagating from the output end 82 of the bus waveguide 56, the modulator 70 modulates the filtered pumped light wave with first data, and an optical fiber (not shown in FIGS. 8-9) coupled to the output of the modulator transmits the modulated pumped light wave to a remote receiver for demodulation and recovery of the first data.

Similarly, the filter 68, which may be optional, filters the Stokes light wave 80, the modulator 72 modulates the filtered Stokes light wave with second data, and an optical fiber (not shown in FIGS. 8-9, and can be the same optical fiber that carries the modulated pumped light wave) coupled to the output of the modulator 72 transmits the modulated Stokes wave to the remote receiver for demodulation and recovery of the second data.

Still referring to FIGS. 8-9, alternate embodiments of the optical communication assembly 50 are contemplated. For example, if the FWHM Brillouin bandwidths of the ring resonator 54 and the bus waveguide 56 are wide enough, the Stokes wave 80 can beget one or more additional Stokes waves at respective optical resonant frequencies of the ring resonator and the bus waveguide, and these one or more additional Stokes waves can be used as one or more additional carrier waves. The filters 66 and 68 can isolate the different carrier waves so that the modulators 70 and 72 can modulate each carrier wave with different data (with only one pumped light wave 78 and only one Stokes wave 80 as described above, the filters 66 and 68 may be omitted from the optical communication assembly 50). Furthermore, the optical communication assembly 50 can include one or more additional components (e.g., multiplexers, demultiplexers, optical couplers) that are omitted from FIGS. 8-9, and can omit one or more components that are described above in conjunction with FIGS. 8-9.

Figure 10:
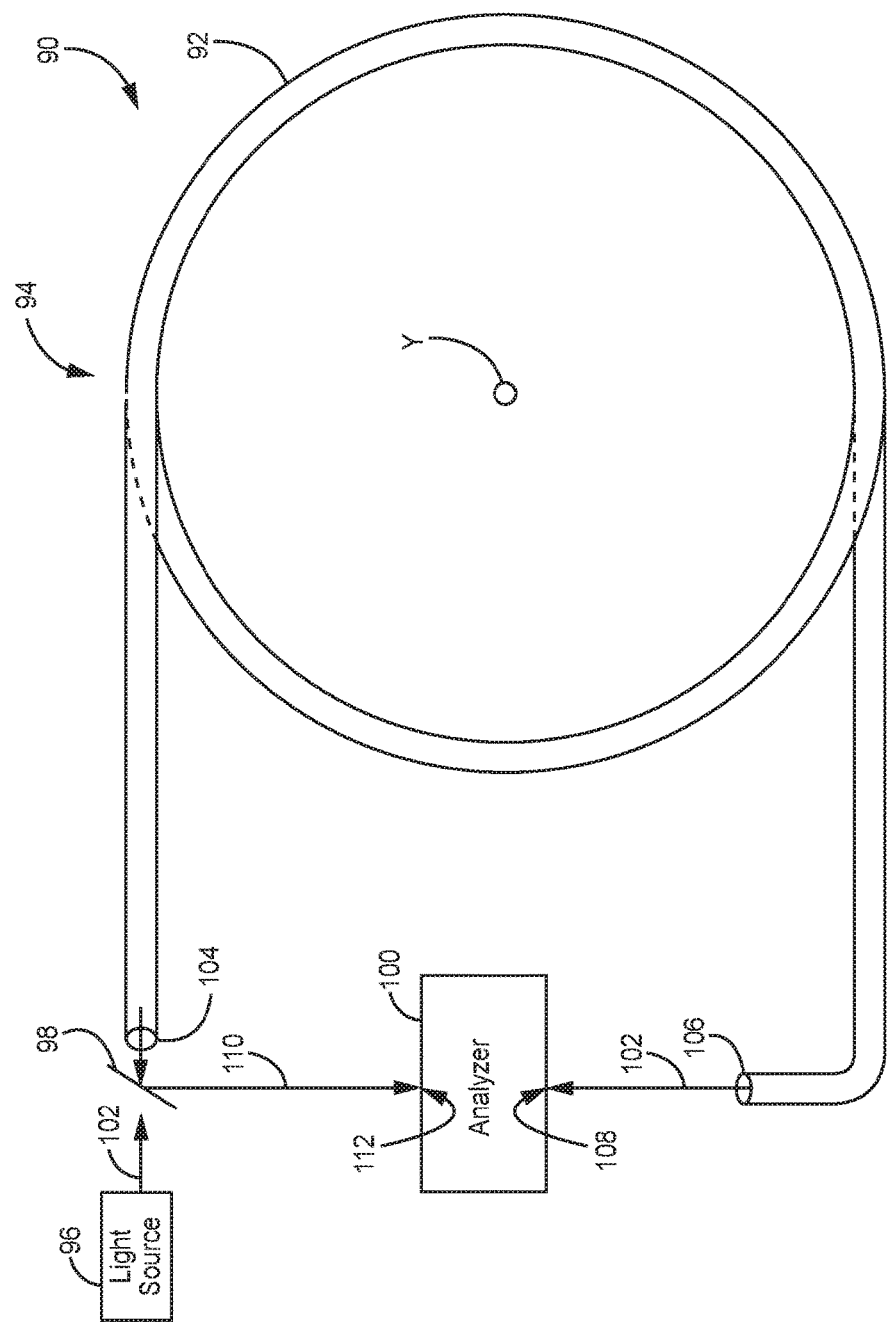
FIG. 10 is a diagram of an optical gyroscope that can include the acousto-optic waveguide of FIG. 6, according to an embodiment.

FIG. 10 is a diagram of an optical gyroscope 90, which includes an optical waveguide 92 having the same structure as the acousto-optic waveguide 38 of FIG. 6, according to an embodiment. For purposes of example, it is assumed that the optical waveguide 92 has the FWHM Brillouin bandwidth 42 of FIG. 7, it being understood that the optical fiber can have other FWHM Brillouin bandwidths. Furthermore, although shown as including one circular loop 94, the waveguide 92 can include multiple loops, and can include one or more loops of other shapes (e.g., rectangular).

In addition to the optical waveguide 92, the optical gyroscope 90 includes a light source (e.g., a laser) 96, a transmissive deflector 98, and an analyzer 100 (e.g., a microprocessor, microcontroller, or other programmable or hardwired circuit).

In operation, the light source 96 generates a light wave 102 having a frequency $f_n$, and pumps the optical waveguide 92 with the light wave at an end 104 of the optical waveguide. The pumped light wave 102 traverses the waveguide 92, exits an end 106 of the waveguide, and is coupled to an input 108 of the analyzer 100.

The pumped light wave 102 induces in the optical waveguide 92, via Brillouin scattering, a counter-propagating Stokes wave 110 having a frequency $f_{n-x}$. The Stokes wave 110 exits the end 104 of the waveguide 92, and the deflector 98 directs the Stokes to an input 112 of the analyzer 100.

The analyzer 100 is configured to determine one or more of an angular position, angular velocity, and angular acceleration of the loop 94 about an axis Y of rotation by comparing the phases or frequencies of the pumped light wave 102 and the Stokes wave 110. It is known that due to the Sagnac effect, rotation of the loop 94 about the Y axis induces respective differences between the phases and frequencies of the pumped light wave 102 and the Stokes wave 111, the instantaneous phase and frequency differences being proportional to the instantaneous velocity of the gyroscope's rotation about the Y axis.

Conventional optical gyroscopes typically include a more complex assembly so that the light source 96 is configured to pump both ends of the optical waveguide 92 with the light wave 102 to generate counter-propagating light waves of the same frequency within the waveguide.

But the gyroscope 90 exploits Brillouin scattering to simply its design. That is, by virtue of the FWHM Brillouin bandwidth of the optical waveguide 92 overlapping/including the frequency $f_n$ of the pumped light wave 102, the optical gyroscope 90 is configured to exploit Brillouin scattering, which is often an unwanted phenomenon, to generate two counter-propagating waves 102 and 110, one at $f_n$ and the other at $f_{n-x}$, in response to the light source 96 pumping only a single end (i.e., the end 104) of the waveguide 92.

Still referring to FIG. 10, alternate embodiments of the optical gyroscope 90 are contemplated. For example, the optical gyroscope 90 can include one or more additional components that are omitted from FIG. 10, and can omit one or more components that are described above in conjunction with FIG. 10.

Figure 11:
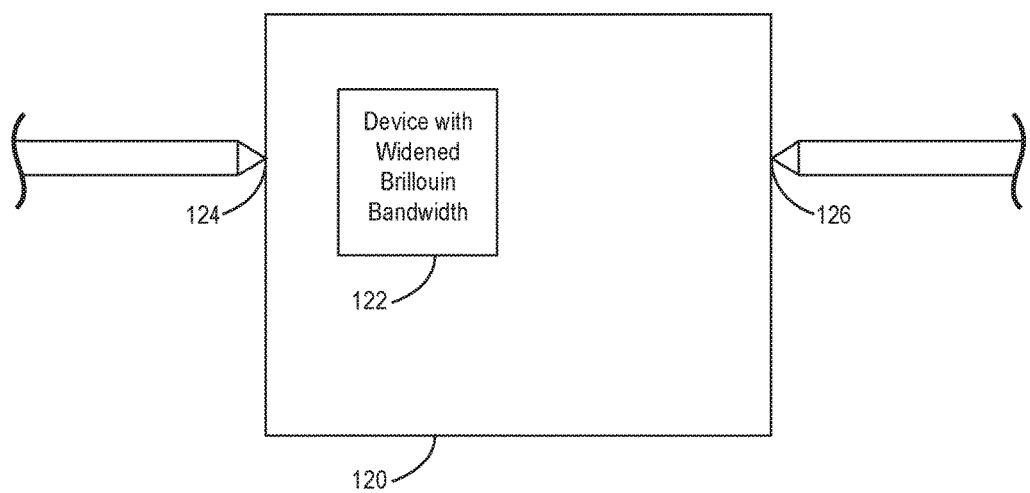
FIG. 11 is a diagram of an integrated photonics circuit that incorporates at least one device, such as the waveguide of FIG. 6, the optical communication assembly of FIG. 8, or the optical gyroscope of FIG. 10, according to an embodiment.

FIG. 11 is a diagram of an integrated photonics circuit 120, which incorporates at least one device 122 with a widened FWHM Brillouin bandwidth, such as the waveguide 38 of FIG. 6, the optical communication circuit 50 of FIG. 8, or the optical gyroscope 90 of FIG. 10, according to an embodiment.

In addition to the device 122, the integrated photonics circuit 120 includes an optical input port 124 and an optical output port 126.

In operation, a light wave propagates into the port 124, to and through the device 122, one or more light waves are output from the port and 126, and one or more Stokes waves, induced by Brillouin scattering, are output from the port 124.

If the device 122 is an optical communication assembly such as the optical communication assembly 50 of FIG. 8, or is an optical gyroscope such as the optical gyroscope 90 of FIG. 10, then the input port 124, the output port 126, or both the input port and the output port, can be omitted if a light source is disposed on the integrated photonics circuit 120.

Furthermore, the integrated photonics circuit 120 can be part of a larger system, such as a computer system, a navigation system, or a smart phone, and can include electronic circuitry. For example, the system can include processing circuitry, such as a microprocessor or microcontroller, coupled to the integrated photonics circuit 120, and the processing circuit and integrated photonics circuit can be disposed on the same integrated-circuit (IC) die or other die, or on different IC dies or other dies.

Still referring to FIG. 11, alternate embodiments of the integrated photonics circuit 120 are contemplated. For example, although described as including only one device 122 with a widened FWHM Brillouin bandwidth, the circuit 120 can include multiple devices with widened Brillouin bandwidths, and multiple input ports and output ports. Furthermore, the device 122 can be configured to operate with electromagnetic signals that are outside of the optical or visible frequency spectrum.

From the foregoing it will be appreciated that, although specific embodiments have been described herein for purposes of illustration, various modifications may be made without deviating from the spirit and scope of the disclosure. Furthermore, where an alternative is disclosed for a particular embodiment, this alternative may also apply to other embodiments even if not specifically stated. Moreover, the components described above may be disposed on a single or multiple integrated-circuit (IC) or integrated-photonic (IP) dies to form one or more ICs/IPs, these one or more ICs/IPS may be coupled to one or more other ICs/IPs. Furthermore, one or more components of a described apparatus or system may have been omitted from the description for clarity or another reason. Moreover, one or more components of a described apparatus or system that have been included in the description may be omitted from the apparatus or system.

Example Embodiments

Example 1 includes a waveguide, comprising: a Brillouin bandwidth; a cladding including first layers of a first material, each first layer having a physical characteristic of approximately a first value, and second layers of a second material, each second layer having the physical characteristic of approximately a second value, the second layers alternating with the first layers such that the Brillouin bandwidth is wider than the Brillouin bandwidth would be if the cladding excluded the first layers or excluded the second layers; and a core disposed within the cladding.

Example 2 includes the waveguide of any of Examples 1-2 wherein the Brillouin bandwidth includes a Brillouin full-width-half-maximum bandwidth.

Example 3 includes the waveguide of any of Examples 1-3 wherein the first material is the same as the second material.

Example 4 includes the waveguide of any of Examples 1-4 wherein the first material is different than the second material.

Example 5 includes the waveguide of any of Examples 1-5 wherein the physical characteristic includes a thickness.

Example 6 includes the waveguide of any of Examples 1-6 wherein the physical characteristic includes an index of refraction.

Example 7 includes the waveguide of any of Examples 1-7 wherein the physical characteristic includes an acoustic velocity.

Example 8 includes the waveguide of any of Examples 1-8 wherein the first value approximately equals the second value.

Example 9 includes the waveguide of any of Examples 1-9 wherein the first value is significantly different than the second value.

Example 10 includes a method, comprising: causing an electromagnetic wave having a first frequency to propagate in an optical waveguide having a full-width-half-maximum Brillouin bandwidth that includes the first frequency; and causing, in response to the electromagnetic wave, a first Stokes wave having a second frequency to propagate in the waveguide, the second frequency being within a full-width-half-maximum optical bandwidth of the waveguide.

Example 11 includes the method of any of Examples 10-11 wherein the first frequency is within the full-width-half-maximum optical bandwidth of the waveguide.

Example 12 includes the method of any of Examples 10-12 wherein the electromagnetic wave includes a second Stokes wave.

Example 13 includes the method of Example 10, further comprising causing, in response to the first Stokes wave, a second Stokes wave having a third frequency to propagate in the waveguide, the third frequency being within the full-width-half-maximum optical bandwidth.

Example 14 includes a method, comprising: forming alternating first and second layers of a first optical cladding region, the first layers having a first physical parameter that is different from the first physical parameter of the second layers; forming a core over the first optical cladding region; and forming alternating third and fourth layers of a second optical cladding region over the core and the first optical cladding region, the third layers having a second physical parameter that is different from the second physical parameter of the fourth layers.

Example 15 includes the method of any of Examples 14-15 wherein the first physical parameter is the same as the second physical parameter.

Example 16 includes the method of any of Examples 14-16 wherein the first physical parameter is different from the second physical parameter.

Example 17 includes the method of any of Examples 14-17 wherein the first and second physical parameters are thickness.

Example 18 includes the method of any of Examples 14-18 wherein the first and second physical parameters are composition.

Example 19 includes the method of any of Examples 14-19 wherein the first and second physical parameters are acoustic velocity.

Example 20 includes the method of any of Examples 14-20 wherein the first and second physical parameters are index of refraction.

Example 21 includes an integrated photonics structure, comprising: an optical device having a portion that includes, a Brillouin bandwidth, a cladding including, first layers of a first material, each first layer having a physical characteristic of approximately a first value, and second layers of a second material, each second layer having the physical characteristic of approximately a second value, the second layers alternating with the first layers such that the Brillouin bandwidth is wider than the Brillouin bandwidth would be if the cladding excluded the first layers or excluded the second layers, and a core disposed within the cladding.

Example 22 includes the integrated photonics structure of any of Examples 21-22 wherein the optical device includes an optical resonator.

Example 23 includes the integrated photonics structure of any of Examples 21-23 wherein the optical device includes an optical gyroscope.

Example 24 includes a system, comprising: an integrated photonics structure, including, an optical device having a portion that includes, a Brillouin bandwidth, a cladding including, first layers of a first material, each first layer having a physical characteristic of approximately a first value, and second layers of a second material, each second layer having the physical characteristic of approximately a second value, the second layers alternating with the first layers such that the Brillouin bandwidth is wider than the Brillouin bandwidth would be if the cladding excluded the first layers or excluded the second layers, and a core disposed within the cladding; and a processing circuit coupled to the integrated photonics structure.

Example 25 includes the system of any of Examples 24-25 wherein the integrated photonics structure and the processing circuit are disposed on a same integrated-circuit die.

Example 26 includes the system of any of Examples 24-26 wherein the integrated photonics structure and the processing circuit are disposed on a same integrated circuit.

Example 27 includes the system of any of Examples 24-27 wherein the integrated photonics structure and the processing circuit are disposed on different integrated-circuit dies.

Example 28 includes the system of any of Examples 24-28 wherein the integrated photonics structure and the processing circuit are disposed on different integrated circuits.

Example 29 includes the system of any of Examples 24-29 wherein the processing circuit includes a microprocessor or a microcontroller.

What is claimed is:

1. A waveguide, comprising:
   a Brillouin bandwidth;
   a cladding including
      first layers of a first material, each first layer having a physical characteristic of approximately a first value, and
      second layers of a second material, each second layer having the physical characteristic of approximately a second value that is different from the first value, the second layers alternating with the first layers such that the Brillouin bandwidth is wider than the Brillouin bandwidth would be if the cladding excluded the first layers or excluded the second layers; and
   a core disposed within the cladding.

2. The waveguide of claim 1 wherein the Brillouin bandwidth includes a Brillouin full-width-half-maximum bandwidth.

3. The waveguide of claim 1 wherein the first material is the same as the second material.

4. The waveguide of claim 1 wherein the first material is different than the second material.

5. The waveguide of claim 1 wherein the physical characteristic includes a thickness.

6. The waveguide of claim 1 wherein the physical characteristic includes an index of refraction.

7. The waveguide of claim 1 wherein the physical characteristic includes an acoustic velocity.

8. The waveguide of claim 1 wherein the first value approximately equals the second value.

9. An integrated photonics structure, comprising:
   an optical device having a portion that includes,
      a Brillouin bandwidth,
      a cladding including,
         first layers of a first material, each first layer having a physical characteristic of approximately a first value, and
         second layers of a second material, each second layer having the physical characteristic of approximately a second value that is different than the first value, the second layers alternating with the first layers such that the Brillouin bandwidth is wider than the Brillouin bandwidth would be if the cladding excluded the first layers or excluded the second layers, and
      a core disposed within the cladding.

10. The integrated photonics structure of claim 9 wherein the optical device includes an optical resonator.

11. The integrated photonics structure of claim 9 wherein the optical device includes an optical gyroscope.

12. A system, comprising:
   an integrated photonics structure, including,
      an optical device having a portion that includes,
         a Brillouin bandwidth,
         a cladding including,
            first layers of a first material, each first layer having a physical characteristic of approximately a first value, and
            second layers of a second material, each second layer having the physical characteristic of approximately a second value that is different from the first value, the second layers alternating with the first layers such that the Brillouin bandwidth is wider than the Brillouin bandwidth would be if the cladding excluded the first layers or excluded the second layers, and
         a core disposed within the cladding; and
   a processing circuit coupled to the integrated photonics structure.

13. The system of claim 12 wherein the integrated photonics structure and the processing circuit are disposed on a same integrated-circuit die.

14. The system of claim 12 wherein the integrated photonics structure and the processing circuit are disposed on a same integrated circuit.

15. The system of claim 12 wherein the integrated photonics structure and the processing circuit are disposed on different integrated-circuit dies.

16. The system of claim 12 wherein the integrated photonics structure and the processing circuit are disposed on different integrated circuits.

17. The system of claim 12 wherein the processing circuit includes a microprocessor or a microcontroller.

* * * * *